United States Patent
Hara et al.

(10) Patent No.: US 10,776,333 B2
(45) Date of Patent: Sep. 15, 2020

(54) BUILDING OF OBJECT INDEX FOR COMBINATORIAL OBJECT SEARCH

(71) Applicant: INTERNATIONAL BUSINESS MACHINES CORPORATION, Armonk, NY (US)

(72) Inventors: Satoshi Hara, Tokyo (JP); Toshinari Itoko, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1051 days.

(21) Appl. No.: 15/217,521

(22) Filed: Jul. 22, 2016

(65) Prior Publication Data

US 2018/0025036 A1    Jan. 25, 2018

(51) Int. Cl.
| | |
|---|---|
| *G06F 16/00* | (2019.01) |
| *G06F 16/22* | (2019.01) |
| *G06Q 10/10* | (2012.01) |
| *G06F 16/24* | (2019.01) |
| *G06F 16/28* | (2019.01) |

(52) U.S. Cl.
CPC .......... *G06F 16/2228* (2019.01); *G06F 16/24* (2019.01); *G06F 16/285* (2019.01); *G06Q 10/105* (2013.01)

(58) Field of Classification Search
CPC .................................................. G06F 16/2228
USPC ....................................................... 707/737
See application file for complete search history.

(56) References Cited

U.S. PATENT DOCUMENTS

| | | | | |
|---|---|---|---|---|
| 8,645,393 | B1 * | 2/2014 | Kolak | G06F 16/334 707/748 |
| 9,443,008 | B2 * | 9/2016 | Vadrevu | G06F 16/35 |
| 2009/0043811 | A1 * | 2/2009 | Yamamoto | G11B 27/105 |
| 2009/0307213 | A1 * | 12/2009 | Deng | G06F 16/35 |

OTHER PUBLICATIONS

"PeopleSoft Enterprise Human Resources 9.1 PeopleBook: Manage Profiles" Oracle (Nov. 2010) pp. 1-258.

* cited by examiner

*Primary Examiner* — Chelcie L Daye
(74) *Attorney, Agent, or Firm* — Tutunjian & Bitetto, P.C.; Vazken Alexanian

(57) ABSTRACT

A computer-implemented method for building an object index used for retrieving an object matching a given query is disclosed. In the method, the computer system initializes a set of clusters, each of which represents at least one base object of a collection. The computer system also enumerates one or more additional clusters by combining multiple clusters from among the set. Each additional cluster represents at least one combinatorial object that has two or more base objects of the collection. The computer system further selects a new set of new clusters by clustering the set of the clusters and the one or more additional clusters, in which each new cluster represents at least one base or combinatorial object. Then, the computer system builds an object index based on the centers of the new clusters such that the object index covers the combinatorial object as a target of retrieval.

17 Claims, 5 Drawing Sheets

BUILDING OF OBJECT INDEX FOR COMBINATORIAL OBJECT SEARCH

BACKGROUND

Technical Field

The present invention, generally, relates to information retrieval techniques, more particularly, to building of an object index used for retrieving an object matching a given query.

Description of the Related Art

Information retrieval techniques have been widely used for searching beneficial information from a collection of information sources such as a database, web, etc. In human resource management, typically, search engines may be used for searching a human resource that meets requirements of a certain task from a collection of human resources.

Depending on the nature of the task, it could be beneficial to search a combination of multiple human resources that totally fulfills the requirement. However, if the number of the human resources grows, it becomes quite difficult to enumerate all combinations of the human resources and evaluate their similarity to a given query, since the number of the combinations rapidly grows in order of $n^k$ ($O(n^k)$: n denotes the number of the human resources and k denotes the size of combination), even if the combination size k is restricted to less than predetermined number. In some fields including human resource management, there is still needed improved information retrieval techniques for handling combinations of objects.

SUMMARY

According to an embodiment of the present invention, there is provided a computer-implemented method for building an object index used for retrieving an object matching a given query. The method includes initializing a set of clusters, each of which represents at least one base object of a collection. The method includes enumerating one or more additional clusters by combining multiple clusters from among the set, in which each additional cluster represents at least one combinatorial object having two or more base objects of the collection. The method also includes selecting a new set of new clusters by clustering the set of the clusters and the one or more additional clusters, in which each new cluster represents at least one base or combinatorial object. The method further includes building an object index based on the centers of the new clusters such that the object index covers the combinatorial object as a target of retrieval.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Now, the present invention will be described using particular embodiments, and the embodiments described hereafter are understood to be only referred as examples and are not intended to limit the scope of the present invention.

One or more embodiments according to the present invention are directed to computer-implemented methods, computer systems and computer program products for building an object index, which can be used for retrieving an object matching a given query, based on a collection of base objects.

Now, referring to the series of FIGS. 1-4, describes a human resource search system and computer-implemented method for building a human resource index, which can be used for retrieving an human resource that matches a given query describing requirements of a task, based on a collection of human resources, according to an exemplary embodiment of the present invention.

Figure 1:
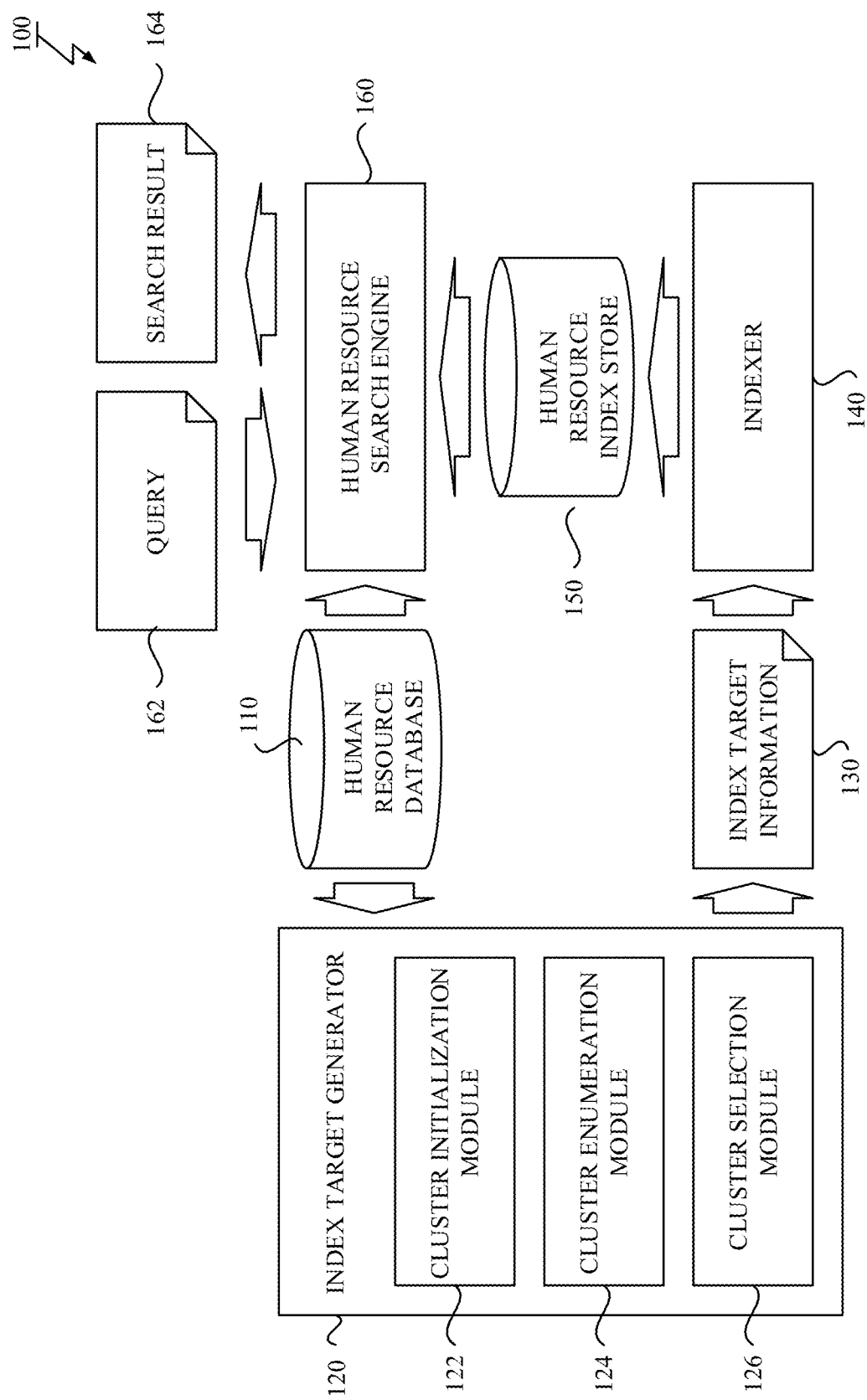
FIG. 1 illustrates a block diagram of a human resource search system according to an exemplary embodiment of the present invention.

FIG. 1 illustrates a block diagram of a human resource search system 100 according to the exemplary embodiment of the present invention. As shown in FIG. 1, the human resource search system 100 may include a human resource database 110, an index target generator 120, an indexer 140, and a human resource index store 150.

The human resource database 110 may be a database that stores a collection of human resources. Each human resource stored in the human resource database 110 may be a single human resource, each of which may hold their attribute information, resume, etc. Feature vector for each human resource can be calculated based on the attribute information, resume, etc. Hereinafter, the human resource that constitutes the collection is referred to as a "base human resource".

In the human resource search system 100 according to the exemplary embodiment, not only the base human resource stored in the human resource database 110 but also a combinatorial human resource (that is a combination of multiple base human resources) may be treated as targets of retrieval in the same manner. Hereinafter, the base human resource and the combinatorial human resource are generically referred to as a "human resource set" regardless of whether it contains multiple human resources or merely single human resource.

The index target generator 120 may generate selected human resource sets as the targets of the retrieval so as to increase discoverability of a human resource set similar to an arbitrary query. To build the human resource index allowing for combinatorial human resource search, the index target generator 120 may iterate enumeration of the combinatorial human resources and selection of the human resource set alternatively based on a clustering technique under a certain upper limit of space complexity.

In the describing embodiment, the index target generator 120 may include a cluster initialization module 122, a cluster enumeration module 124 and a cluster selection module 126.

The cluster initialization module 122 may be configured to initialize an initial set of clusters, each of which may represent at least one base human resource of the collection stored in the human resource database 110.

The cluster enumeration module 124 may be configured to enumerate one or more additional clusters by combining multiple clusters from among the clusters in the set. Each additional cluster may represent at least one combinatorial human resource. In first iteration, the clusters in the initial set may be used for enumeration. In second or later iteration, new clusters in a new set obtained in a previous iteration may be used for enumeration in current iteration. Hereinafter, with respect to a certain iteration, the cluster used for enumeration is referred to as an original cluster to distinguish from the additional cluster.

The cluster selection module 126 may be configured to select a new set of new clusters by clustering clusters including the original clusters and the additional clusters into the predetermined number of the new clusters based on dissimilarity.

In a describing embodiment, the dissimilarity can be measured by a distance between points of two elements (each element corresponds to the original, additional or new cluster, or the query) in Euclidean space. However, the dissimilarity can be defined in a different way. In another embodiment, the dissimilarity between points may be given in a form of dissimilarity matrices instead of the distance.

In one or more embodiments, one of any known general agglomerative clustering techniques including nearest neighbor clustering (single linkage clustering), furthest neighbor clustering (complete linkage clustering), group average clustering, etc., k-means clustering and k-medoids clustering can be employed, to name but a few.

For simplicity, most of following discussion assumes that all of the clusters and the query are given as points in Euclidean space; although the novel technique can be generally applicable and/or extendable to any system where the dissimilarity between points of two elements can be defined.

Due to the selection, the original cluster and the additional cluster may be aggregated to form a single new cluster. Each new cluster may represent at least one base or combinatorial human resource depending on which the original and/or additional clusters has aggregated.

During the iteration, the index target generator 120 may treat the new set of the new clusters obtained by the selection in the previous iteration as the set of the clusters used for the enumeration in the current iteration. The index target generator 120 may increase a target size of the additional cluster to be enumerated from two up to predetermined value in a step-by-step manner. Prior to the selection, the index target generator 120 may calculate the number of the new clusters to be selected based on an algorithm parameter that defines an upper limit of space complexity.

Then, the index target generator 120 may create index target information 130 based on the cluster finally obtained, and deliver the index target information 130 to the indexer 140. The index target information 130 may include the center of each final cluster and one or more members represented by each final cluster. Each member may be the base human resource or the combinatorial human resource.

The indexer 140 may be configured to build a human resource index based on the centers of the final clusters such that the human resource index covers not only the base human resources but also the combinatorial human resources as the targets of retrieval. In one or more embodiments, any known indexing techniques can be employed, which may include Kd (K dimensional) tree and LSH (Locality Sensitive Hashing), for example.

The human resource index store 150 may store the human resource index built by the indexer 140. The data structure of the human resource index may be in a variety of form, which may include a tree structure, a hash table, etc., depending on a specific indexing technique employed by the indexer 140. In any of the embodiments, the human resource index provides a human resource set represented by a nearest cluster with the center closest to a point given by the query, i.e. one of the human resource sets best matching the given query.

In a describing embodiment, the human resource search system 100 may further include a human resource search engine 160. The human resource search engine 160 may be configured to receive a query 162 and return a search result 164 including information about at least one human resource set matching the query 162 via an interface such as display and input devices, a network adaptor, etc.

In a describing embodiment, the query may include a query feature vector that defines a point in Euclidean space. In response to receiving the query, the human resource search engine 160 may identify a nearest cluster (which has smallest dissimilarity) to a point defined by the query feature vector using the human resource index stored in the human resource index store 150. A nearest cluster or a plurality of nearest clusters may be identified depending on a search parameter, for example. If there is the plurality of the nearest clusters, the nearest clusters may be sorted based on the dissimilarity to the query.

The search result 164 may include a member nearest to the query from among one or more members included in the nearest cluster, each of which may be the base human resource or the combinatorial human resource. Alternatively, the search result 164 may include a plurality of members included in the nearest cluster.

In a particular embodiment, the human resource search engine 160 may further retrieve information about a relating base human resource included in the search result 164 from the human resource database 110. The relating base human resource may be a base human resource represented by the nearest cluster or an element of the combinatorial human resource represented by the nearest cluster.

In particular embodiments, each of modules 110, 120, 122, 124, 126, 140, 150, and 160 described in FIG. 1 may be implemented as, but not limited to a software module including program instructions and/or data structures in conjunction with hardware components such as a processor, a memory, etc.; a hardware module including electronic circuitry; or a combination thereof. These modules 110, 120, 122, 124, 126, 140, 150 and 160 described in FIG. 1 may be implemented on a single computer device such as a personal computer and a server machine, or over a plurality of devices such as a computer cluster of computer devices in a distributed manner.

Hereinafter, with referring to FIGS. 2-4, described is a novel process for building the human resource index used for retrieving the human resource set based on the collection of the base human resources.

Figure 2:
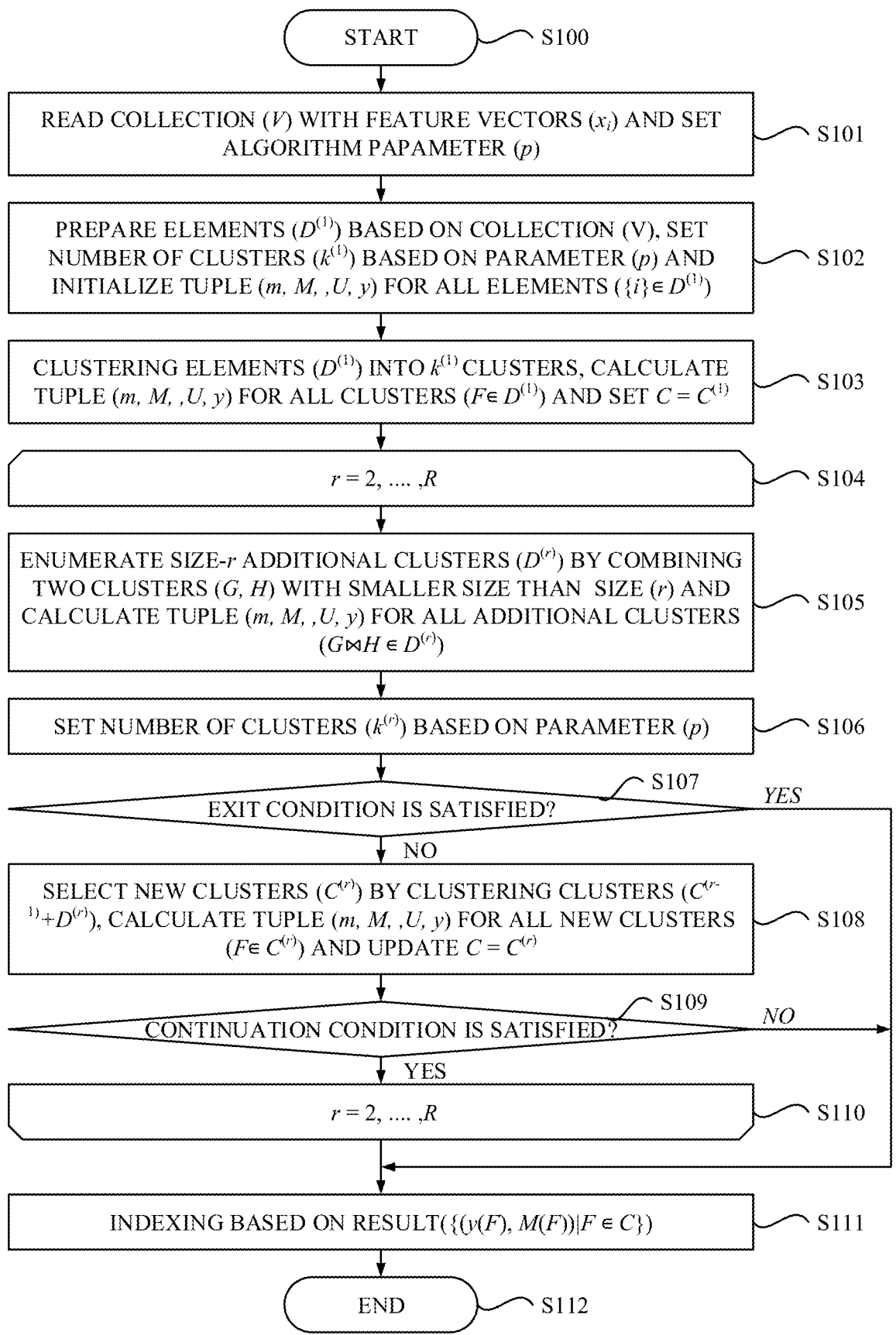
FIG. 2 is a flowchart depicting a process for building a human resource index in the human resource search system according to the exemplary embodiment of the present invention.

FIG. 2 shows a flowchart depicting the process for building the human resource index in the human resource search system 100 shown in FIG. 1. Note that the process shown in FIG. 2 may be performed by a processing unit that implements the index target generator 120 and the indexer 140 shown in FIG. 1.

The process shown in FIG. 2 may begin in response to receiving a request for indexing with an argument that specifies the collection of the base human resources. A user may request of the processing unit to perform an indexing process via command line user interface or graphical user interface.

At step S101, the processing unit may read the collection V with feature vectors $x_i$ from the human resource database 110 and set an algorithm parameter p. The collection V, the feature vectors $x_i$ and the algorithm parameter p may be defined by the following equations:

$$\text{Collection } V:=\{1,2,\ldots,n\}, \quad (1)$$

$$\{x_1, x_2, \ldots, x_n\}: \text{Feature vectors (of } V), \quad (2)$$

p: Algorithm parameter satisfying conditions:

$$p = O(\sqrt{n}) \text{ and } 1 < \lceil p\sqrt{n} \rceil \leq \frac{n(n+1)}{2}. \quad (3)$$

Note that n denotes the number of the base human resources in the collection V. Each feature vector $x_i$ may describe a skill set of the base human resource i. The algorithm parameter p may define an upper limit of the space complexity of the algorithm. The algorithm parameter p may be given based on an argument of the request. The aforementioned conditions for the parameter p may provide a preferable range of the parameter p where the number of final index targets and the space capacity for storing the human resource index would be balanced; however, the parameter p may not be limited to this range as far as the computer resources allow.

At step S102, the processing unit may prepare a set of elements $D^{(1)}$ based on the collection V, set the number of the cluster to be prepared $k^{(1)}$ based on the algorithm parameter p, and initialize a tuple (m, y, M, U) for all elements $\{i\}$ included in the set $D^{(1)}$. The set of the elements $D^{(1)}$ and the number of the cluster $k^{(1)}$ may be defined by the following equations:

$$D^{(1)}:=\{\{i\}|i\in V\}, \quad (4)$$

$$k^{(1)}:=\min\{\lceil p\sqrt{n} \rceil, n\}. \quad (5)$$

As shown in the aforementioned equation (4), each base human resource in the collection V may be represented by each element $\{i\}$. The tuple (m, y, M, U) for all elements $\{i\}$ included in the set $D^{(1)}$ may be initialized by the following equations:

Initialize (m, y, M, U) for all $\{i\}\in D^{(1)}$ by:

$$m(\{i\})=1, \quad (6)$$

$$y(\{i\})=x_i, \quad (7)$$

$$M(\{i\})=\{\{i\}\}, \quad (8)$$

$$U(\{i\})=\{i\}. \quad (9)$$

In a describing embodiment, the element (and the cluster that includes at least one element as a result of subsequent clustering) may be managed by the aforementioned tuple (m, y, M, U), where m denotes the representative cardinality, y denotes the center, M denotes one or more representative members and U denotes one or more participating base human resources of each element (or each cluster).

At step S103, the processing unit may perform clustering the elements $D^{(1)}$ into $k^{(1)}$ clusters based on dissimilarity, calculate a tuple (m, y, M, U) for all clusters F included in the set $C^{(1)}$ and set $C=C^{(1)}$. The clustering of the set of the elements $D^{(1)}$ into the $k^{(1)}$ clusters may be expressed by the following equation:

$$C^{(1)}=\text{CLUSTRING}(\emptyset, D^{(1)}, k^{(1)}). \quad (10)$$

Note that the number of the clusters to be prepared $k^{(1)}$ may be or may not be limited by the algorithm parameter p as shown in the aforementioned equation (5). If the algorithm parameter p is relatively large (i.e. $k^{(1)}=n$ as a result of the equation (5)), each cluster F included in the set $C^{(1)}$ may include a respective single element (e.g. $\{\{3\}\}$). If the algorithm parameter p is relatively small (i.e. $k^{(1)}<n$ as a result of the equation (5)), each cluster F may include a respective single element (e.g. $\{\{3\}\}$) or respective multiple elements (e.g. $\{\{1\}, \{2\}\}$). Thus, each cluster may represent at least one base human resource.

The tuple (m, y, M, U) for each cluster F included in the set $C^{(1)}$ may be calculated based on the tuple (m, y, M, U) of at least one element in each cluster. Equations used to calculate the tuple (m, y, M, U) for each cluster F will be shown in later.

Figure 3A:
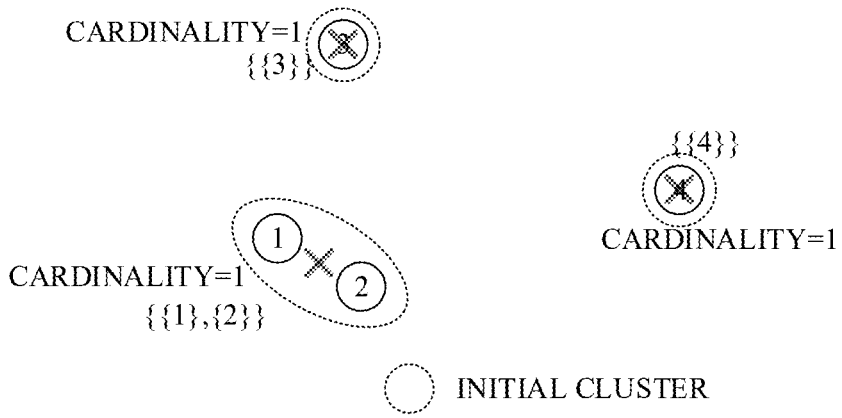
FIG. 3A describes a schematic of the initialization of the clusters in the human resource search system.

FIG. 3A describes a schematic of the initialization of the clusters in the human resource search system 100. In FIG. 3A, each solid circle with a number expresses each element representing one base human resource of the collection V. Each dotted circle surrounding one or more elements express each initial cluster obtained by step the S103. Note that the initial cluster surrounding two elements ($\{1\}, \{2\}$) in FIG. 3A does not represent the combinatorial human resources, but it does represent two distinct base human resources as representative members. Each center of each initial cluster is represented by a solid gray cross in FIG. 3A.

Referring back to FIG. 2, during a loop from step S104 through step S110, the processing unit may iterate enumeration of the combinatorial human resources and selection of the human resource sets alternatively for the given initial clusters prepared by the step S103, while incrementing a target size r of the additional clusters from 2 (two) up to a predetermined value R. The predetermined value R may be given by an argument of the request.

At step S105, the processing unit may enumerate a set of one or more additional clusters $D^{(r)}$ that has the target size r by combining multiple original clusters G, H from among the set of the original clusters $C^{(r-1)}$ and calculate a tuple (m, y, M, U) for all additional clusters included in the set $D^{(r)}$. Each additional cluster may represent at least one combinatorial human resource. The set of the additional clusters $D^{(r)}$ may be defined by the following equation:

$$D^{(r)}:=\{G \bowtie H | G\in C_a^{(r-1)}, H\in C_b^{(r-1)}, a+b=r, U(G)\cap U(H)=\emptyset\}$$

where $C_i^{(r)}:=\{F|F\in C^{(r)}, m(F)=i\}$ for $i=1,\ldots,r$. (11)

As described above, each original cluster holds the representative cardinality m and the participating base human resources U in the tuple. In the step S105, the processing unit may pick up the multiple original clusters G, H that have a total size (a+b) identical to the target size of the additional cluster r and no participating base human resources in common from among the set $C^{(r-1)}$. The sizes of the original clusters a, b may be defined by the representative cardinality m of the original cluster.

At the step S105, the processing unit may calculate the tuple (m, y, M, U) for all additional clusters included in the set $D^{(r)}$ based on the tuple (m, y, M, U) of the multiple original clusters G, H by following equations:

Compute (m, y, M, U) for all $G \bowtie H \in D^{(r)}$ by:

$$m(G \bowtie H) = r, \tag{12}$$

$$y(G \bowtie H) = \frac{m(G)y(G) + m(H)y(H)}{m(G) + m(H)} \tag{13}$$

$$\text{or} \left( \frac{\Sigma_{S \in M(G \bowtie H)} y(S)}{|M(G \bowtie H)|} \right),$$

$$M(G \bowtie H) = \tag{14}$$
$$\text{SELECT\_N\_NST(FLAT\_PRODUCT}(M(G), M(H)), y(G \bowtie H)),$$

$$U(G \bowtie H) = U(G) \cup U(H) \text{ or } \left( \bigcup_{S \in M(G \bowtie H)} U(S) \right). \tag{15}$$

In the equations herein, |A| denotes the number of elements in a given set A. In the equation (14), the function "FLAT_PRODUCT (A, B)" denotes operations that include calculating a (cartesian) product of given two sets A, B each includes one or more sets as its elements; and flattening elements in the calculated product. An example of calculation of the function "FLAT_PRODUCT" is shown as follows:

FLAT_PRODUCT({{1,2},{3,4,5}},{{6}})={{1,2,6}, {3,4,5,6}}.

In the equation (14), the function "SELECT_N_NST(A, t)" denotes operations that include extracting maximum (N) sets having a centroid closest to a given reference point t from among a given set A that includes one or more sets as its elements. The centroid of the set S (that is element of the given set A) can be calculated as a centroid of elements in the set $\{x_i | i \text{ in } S\}$.

As described above, each original cluster has the center y and holds the one or more representative members M in the tuple. As shown in the equation (14), the representative member M of the additional cluster can be obtained by calculating a (cartesian) product of a first set of the representative members in one clusters M(G) and a second set of the representative members in other clusters M(H); and by extracting maximum N elements closest to the center y of the additional cluster from among the calculated product. The maximum length of the representative member N may be given by an argument of the request.

The center y and the participating base human resources U of the additional cluster may be calculated in different ways, one of which is shown on the left without parenthesis while the other is shown on the right with parenthesis in the equations (13) and (15), respectively.

According to the left part in the equation (13), the center y of the additional cluster can be calculated based merely upon the tuples (m, y, M, U) of the multiple original clusters G, H, that are already available at the beginning of the current iteration. On the other hand, according to the right part in the equation (13) for calculating the center y of the additional cluster, it may require the representative members M of the additional cluster that also requires the center y of the additional cluster for its calculation.

Thus, if the center y is defined according to the right part in the equation (13), first, the processing unit may calculate a tentative center y' according to the left part in the equation (13), then calculate the representative member M of the additional cluster based on the tentative center y' according to the equation (14), finally, calculate the center y according to the right part in the equation (13).

Figure 3B:
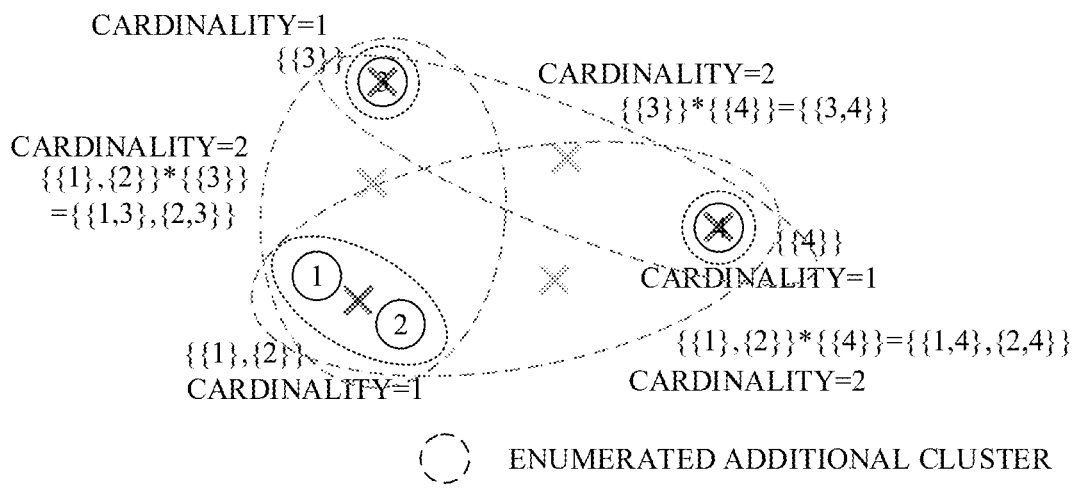
FIG. 3B describes a schematic of the enumeration of the clusters in the human resource search system.

FIG. 3B describes a schematic of the enumeration of the clusters in the human resource search system 100. In FIG. 3B, there are three additional clusters enumerated by the step S105, each of which is expressed by the dashed gray circle surrounding multiple original clusters in comparison with FIG. 3A.

Note that the additional cluster surrounding the multiple original clusters (e.g. {{3}} and {{4}}) does represent the combinatorial human resource (e.g. {{3, 4}}), thus the representative cardinality of this additional cluster is two (2). Other additional cluster surrounding the multiple original clusters (e.g. {{1}, {2}} and {{4}}) also represents the combinatorial human resources (e.g. {{1, 4}, {2, 4}}). The center y of the additional cluster is represented by a solid light-gray cross, whereas the center of the original cluster y(G) or y(H) is represented by a solid gray cross in FIG. 3B.

Referring back to FIG. 2, at step S106, the processing unit may calculate and set the number of the new clusters to be selected $k^{(r)}$ based on the algorithm parameter p by following equations:

$$k^{(r)} = \begin{cases} \sum_{i=1}^{r} k_i & (\text{Type} - A) \\ \lceil p\sqrt{n} \rceil & (\text{Type} - B) \end{cases}, \tag{16}$$

where $k_i := \left\lfloor \frac{|D^{(i)}|}{\frac{i-1}{2}(\lceil p\sqrt{n} \rceil + 1)} \right\rfloor$ for $i \geq 2$ and $k_1 := k^{(1)}$.

There may be mainly two types of variations for clustering in steps S103 and S108 (described later). In a first type (Type-A), human resource sets in a same cluster in a previous step may be kept in a same cluster in a next step. In a second type (Type-B), human resource sets in a same cluster in a previous step can be in different cluster in a next step.

According to the equation (16), depending on the type of the clustering (Type-A/Type-B), the number of the new clusters to be selected $k^{(r)}$ may be calculated differently, but both of which use the algorithm parameter p.

At step S107, the processing unit may determine whether or not the additional clusters newly enumerated in the step 105 meets a termination condition as follows:

$$(\text{termination condition}) := \begin{cases} |D^{(r)}| < \frac{r-1}{2}(\lceil p\sqrt{n} \rceil + 1) & (\text{Type} - A) \\ D^{(r)} = \emptyset & (\text{Type} - B) \end{cases}. \tag{17}$$

Depending on the type of the clustering, the termination condition may be different, but both of which indicate that the additional clusters $D^{(r)}$ could not be newly enumerated at the step S105. According to the termination condition (17), the number of intermediate human resource sets that are considered tentatively by the algorithm may be limited to be in the order of $O(R*p^2*n)$ for the first type (Type-A) or $O(p^2*n)$ for the second type (Type-B).

If the processing unit determines that the termination condition is not met in the step S107 (NO), then the process may proceed to step S108.

At step S108, the processing unit may select a new set of clusters $C^{(r)}$ by clustering the set of the original clusters $C^{(r-1)}$ and the set of the additional clusters $D^{(r)}$ into $k^{(r)}$ clusters based on dissimilarity, calculate a tuple (m, y, M, U) for all clusters F included in the set $C^{(r)}$ and set $C=C^{(r)}$. The clustering of the original clusters $C^{(r-1)}$ and the additional clusters $D^{(r)}$ into the $k^{(r)}$ clusters may be expressed by following equation:

$$C^{(r)}=\text{CLUSTRING}(C^{(r-1)},D^{(r)},k^{(r)}). \quad (18)$$

Each new cluster may represent at least one base or combinatorial human resources. As described above, there may be the two types of clustering (Type-A and Type-B). The agglomerative clustering techniques such as the complete linkage clustering can be used as the first type (Type-A). In this case, aggregation between the original clusters (C-C) may be forbidden while aggregation between the original cluster and the additional cluster (C-D) and aggregation between the additional clusters (D-D) may be allowed. The k-means clustering can be used as the second type (Type-B).

In the step S108, the processing unit may calculates the tuple (m, y, M, U) for all new clusters F included in the set $C^{(r)}$ based on the tuple (m, y, M, U) of previous clusters Q that are members of each new cluster F, by following equations:

Compute (m, y, M, U) for all $F \in C^{(r)}$ by:

$$m(F) = \min_{Q \in F} m(Q) \to F^* := \operatorname{argmin}_{Q \in F} m(Q), \quad (19)$$

$$y(F) = \frac{\Sigma_{C \in F^*} y(Q)}{|F^*|} \text{ or } \left(\frac{\Sigma_{S \in M(F)} y(S)}{M(F)}\right), \quad (20)$$

$$M(F) = \text{SELECT\_N\_NEAREST}\left(\bigcup_{Q \in F^*} M(Q), y(F)\right), \quad (21)$$

$$U(F) = \bigcup_{Q \in F} U(Q) \text{ or } \left(\bigcup_{S \in M(F)} U(S)\right). \quad (22)$$

Figure 3C:
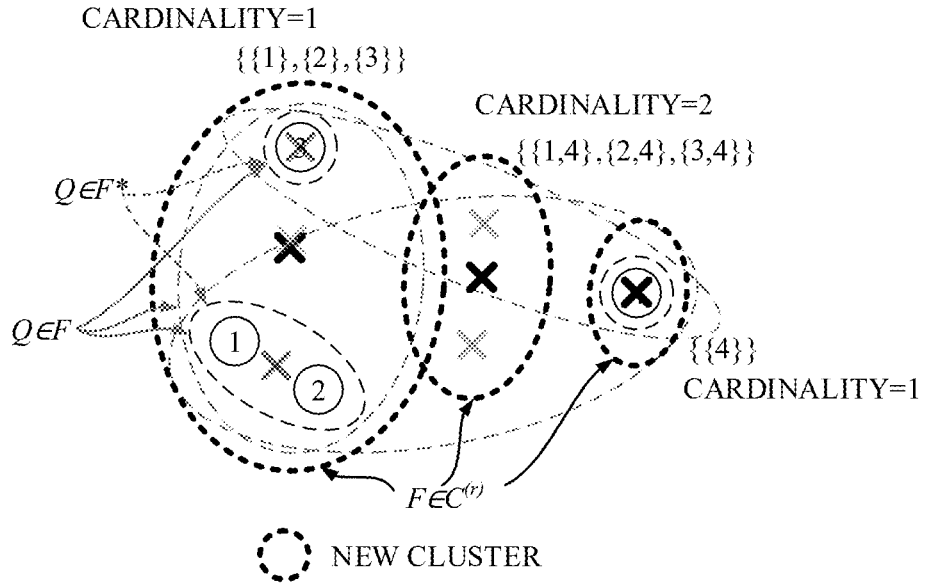
FIG. 3C describes a schematic of the selection of the clusters in the human resource search system.

FIG. 3C describes a schematic of the selection of the clusters in the human resource search system 100. In FIG. 3C, there are three new clusters F selected by the step S108, each of which is expressed by the dashed bold circle surrounding the centers of the one or more original and/or additional clusters in comparison with FIG. 3B.

As described above, each new cluster F may include one or more members (previous clusters) Q as shown in FIG. 3C. Each member may have the center y(Q) and the representative cardinality m(Q). As shown in the equation (19), the representative cardinality m(F) may be obtained as the minimum of the representative cardinality m(Q) from among all members Q in F. A set $F^*$ represents a subset of the new cluster F that includes one or more smallest members having the minimum of the representative cardinality as shown in FIG. 3.

The center y(F) and the participating base human resources U(F) of the new cluster may be calculated in different ways, one of which is shown on the left without parenthesis while the other is shown on the right with parenthesis in the equations (20) and (22), respectively.

According to the left part in the equation (20), the center of the new cluster y(F) can be calculated based on the centers of the smallest members Q in the subset $F^*$.

As similar to the enumeration, if the center y(F) is defined according to the right part in the equation (20), first, the processing unit may calculate a tentative center y' according to the left part in the equation (20), then calculate the representative member M (F) based on the tentative center y' according to the equation (21), finally, calculate the center y(F) according the right part based on the representative member M (F) in the equation (20).

As shown in the equation (21), a limited number (maximum N) of representative members closest to the center of the new cluster y(F) may be extracted from a union of the representative members M(Q) of all smallest members Q in the subset $F^*$ as the representative members of the new cluster M(F).

Since merely the limited number (maximum N) of the representative members may be maintained in the variable M for each cluster, the human resource search engine 160 can present multiple human resource sets in response to a given query while saving memory usage for the human resource index. For example, if the nearest cluster closet to the given query may include multiple representative members M={{1,3}, {2,3}, {2,4}}, the human resource search engine 160 may offer not only a single human resource set {1,3} but also multiple human resource sets {1,3} and {2,4}.

Since the representative members M(F) is calculated based on the subset $F^*$, the representative members of larger members in the set (which may be a complement of $F^*$ in F) may be spilled from the variable M(F). An example can be found in FIGS. 3B and 3C, in which the representative members M(F) includes only {{1}, {2}, {3}} in spite of including the additional cluster representing {{1,3}, {2,3}} with a cardinality of 2.

In the describing embodiment, thus, the smallest members with the minimum cardinality may be kept when aggregating clusters in the selection step. However, the representative members M(F) can be calculated in different ways. In other embodiment, "max" and "argmax" functions may be employed instead of "min" and "argmin" functions in the equation (19).

If the variables y(F) and U(F) are defined by the right part in the equations (20) and (22), information about members spilled out from the representative members M(F) may not be taken into account in its calculation. On the other hand, if the variables y(F) and U(F) are defined by the left part in the equations (20) and (22), information about not only remaining representative members in the M(F) but also the members spilled out from M(F) can be preserved.

Referring back to the step S103 for a while, the tuple (m, y, M, U) for each cluster F included in the set $C^{(1)}$ can also be calculated by the aforementioned equations (19)-(22) based on the tuple (m, y, M, U) of at least one member in each cluster F.

At step S109, the processing unit may determine whether or not the continuation condition is met. The continuation condition may be expressed as follows:

if $r<n$ and $|C_r^{(r)}|>0$.

If the processing unit determines that the continuation condition is met in the step S109 (YES), then the process proceeds to step S110.

At step S110, if the target size r is less than the predetermined value R, the target size r of the additional cluster may be incremented by one (1) and the process may loop back to step S104. As described above, the enumerating and the selecting may be alternatively iterated while treating the new set of the new clusters obtained in the previous iteration as the set of the clusters used in the current iteration. If the target size r has reached the predetermined value R, the process proceeds to step S111.

Referring back to step S107, if the processing unit determines that the termination condition is met in the step S107 (YES), the process may exit the loop and the process may proceed to step S111. Also, if the processing unit determines that the continuation condition is not met in the step S109 (NO), then the process may exit the loop and proceed to step S111.

At step S111, the processing unit may perform indexing based on the centers and the representative members of the final clusters, $\{y(F), M(F)|F \text{ in } C\}$, to build the human resource index. Since the representative members M(F) may include the combinatorial human resource, the human resource index can cover the combinatorial human resource as the targets of retrieval. Finally, the process ends at step S112.

Figure 4A:
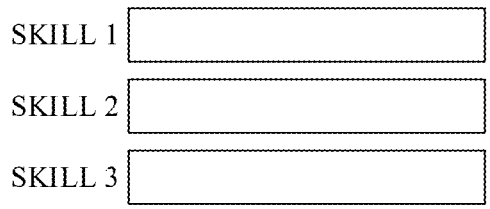
FIG. 4A shows an example of requirements for a certain task, which defines desired levels of three types of skills.
Figure 4B:
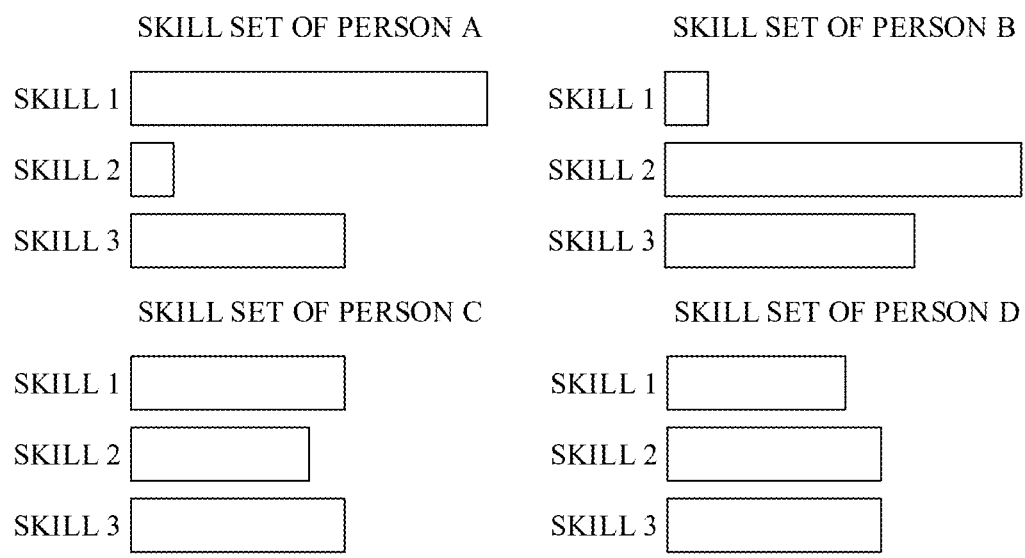
FIG. 4B shows examples of skill sets of the base human resources (persons A, B, C, and D)
Figure 4C:
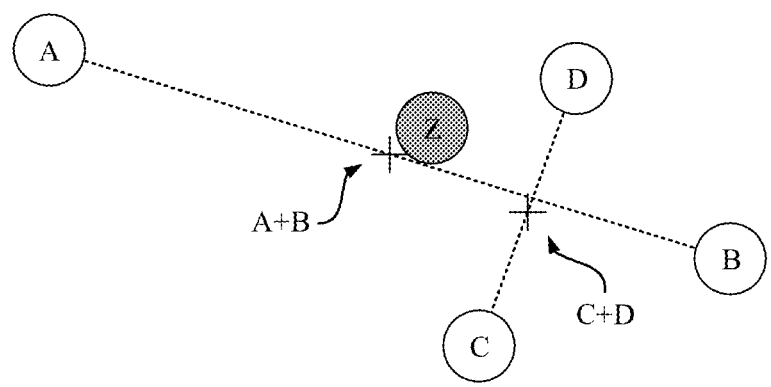
FIG. 4C illustrates the given query (Z), the base human resources (A, B, C, D) and the combinatorial human resources (A+B, C+D) in a schematically two dimensional feature space.

FIG. 4 describes schematics of retrieving a human resource set that matches a given query based on the human resource index built by the process shown in FIG. 2. FIG. 4A shows an example of requirements for a certain task, which defines desired levels of three types of skills. FIG. 4B shows examples of skill sets of the base human resources (persons A, B, C, and D). FIG. 4C illustrates the given query (Z), the base human resources (A, B, C, D) and the combinatorial human resources (A+B, C+D) in a schematically two dimensional feature space.

As shown in FIG. 4C, the given query denoted by "Z" may be closest to the base human resource denoted by "D" among the base human resources (A, B, C, D) in the feature space. Thus, a search engine utilizing a human resource index that covers only the base human resources would offer the human resource set of "D" as a search result.

In contrast, according to the describing embodiment, since the human resource search engine 160 may utilize the human resource index covering the combinatorial human resources, the human resource search engine 160 can offer a human resource set that is the combinatorial human resources of "A+B", which has a center closest to the given query of "Z", even if the base human resources of "A" and "B" are singly farther from the given query "Z" than the base human resources of "C" and "D" as well as the comminatorian human resource of "C+D".

According to the exemplary embodiment of the present invention, there is provided a human resource search system and computer-implemented method for building a human resource index that allows for efficiently retrieving a human resource set totally satisfying the requirements of any given task with reducing the space complexity while minimizing loss of optimality of search results.

According to preliminary estimation, upper limit of the space complexity may be in the order $O(N*R*p^2*n)$, where N denotes the maximum length of the representative members M, R denotes maximum number of the iteration and the size of the combinatorial human resource, p denotes the algorithm parameter in the order of $O(n^{1/2})$ and n denotes the number of the base human resources.

In the obtained human resource index, the targets of retrieval can be expected to be distributed in the feature space as possible, since the clusters close to each other may be aggregated preferentially by the clustering, thereby increasing discoverability for an arbitrary query.

In the above described embodiment, the description is mainly directed to human resource search and/or task matching applications, where the human resource index is built based on the collection of the base human resources. Also it is assumed that all of the targets and the queries are given as points in Euclidean space and the dissimilarity between these elements can be measured by a distance in Euclidean space.

However, the novel technique according to one or more embodiments of the present invention can be applicable and/or extendable to any systems where any kind of objects are treated as a target of retrieval and dissimilarity or similarity between each of two elements is defined in any form.

In a particular embodiment, dissimilarity between the human resources can be defined based on document similarity between resumes of persons. If necessary, based on the dissimilarity, the features of the human resources can be mapped to Euclidean space by MDS (Multi-Dimensional Scaling). In a particular embodiment, the center of the cluster may be the centroid of its members, and cosine similarity can be used to measure the similarity. In a particular embodiment, the human resource search engine 160 can find the human resource set that maximizes the similarity to the given query by assuming that the combined skill of the combinatorial human resource is defined by an average of its members.

In another particular embodiment, the human resources may be assumed to be characterized along a plurality of axes each corresponding to each type of skill, where the scale of each axis is normalized so as to be comparable across different axes (i.e. the score of one skill type is comparative to the same score of another skill type). Also the combined skill of the human resource set may be assumed to be defined by the maximum among the members for each skill type (e.g., team of experts in each field). In the other particular embodiment, the center of the cluster may be defined to be maximums for each axis among its members, and L1 norm can be used to measure the dissimilarity.

Computer Hardware Component

Figure 5:
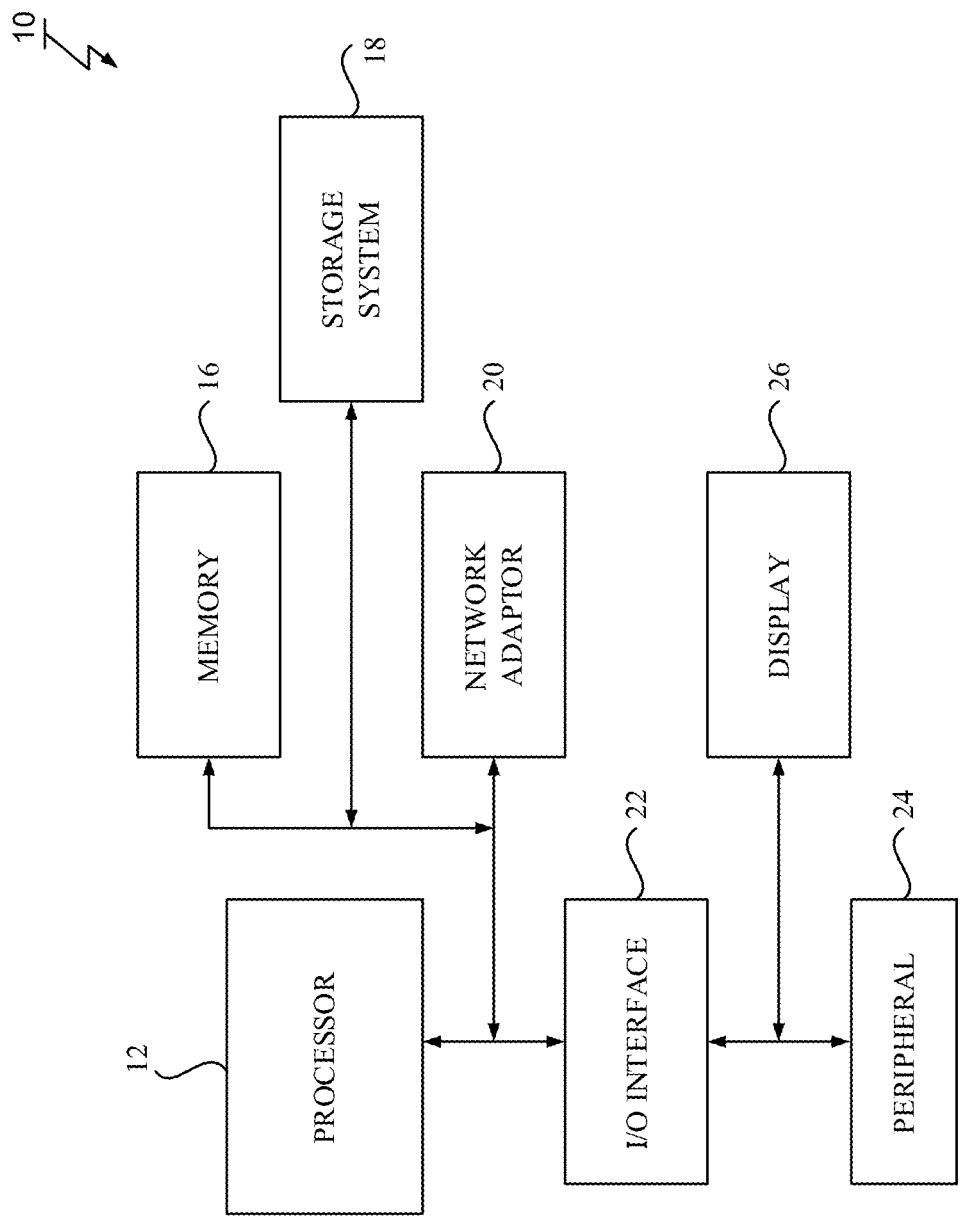
FIG. 5 depicts a computer system according to one or more embodiments of the present invention.

Referring now to FIG. 5, a schematic of an example of a computer system 10, which can be used for the human resource search system 100, is shown. The computer system 10 shown in FIG. 5 is implemented as computer system. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, handheld or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, for example, that perform particular tasks or implement particular abstract data types.

As shown in FIG. 5, the computer system 10 is shown in the form of a general-purpose computing device. The components of the computer system 10 may include, but are not limited to, a processor (or processing unit) 12 and a memory 16 coupled to the processor 12 by a bus including a memory bus or memory controller, and a processor or local bus using any of a variety of bus architectures.

The computer system 10 typically includes a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

A program and/or utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Also, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via the bus. It should be understood that although not shown, other hardware and/or software components may be used in conjunction with the computer system 10. Examples, include, but are not limited to: microcode, device drivers, redundant processing units, external disk drive arrays, RAID systems, tape drives, and data archival storage systems, etc.

Computer Program Implementation

The present invention may be a computer system, a method, and/or a computer program product. The computer program product may include a computer readable storage medium (or media) having computer readable program instructions thereon providing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing and/or processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter example, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create a means for implementing the functions and/or acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function and/or act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions and/or acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of the instructions, which comprises one or more executable instructions for implementing the specified logical function(s). In some alternative implementations, the functions noted in the block may occur out of the order as noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for building an object index used for retrieving an object matching a given query, the method comprising:
   initializing a set of clusters, each of the clusters representing at least one base object of a collection, each base object including a feature vector;
   enumerating one or more additional clusters by combining multiple clusters from among the set of clusters, each additional cluster representing at least one combinatorial object having two or more base objects of the collection;
   selecting a new set of new clusters by clustering the set of the clusters and the one or more additional clusters, each new cluster representing at least one base or combinatorial object;
   alternatively iterating the enumerating and the selecting while treating the new set of the new clusters obtained in a previous iteration as the set of the clusters used in a current iteration and incrementing a target size of the additional cluster from two up to a predetermined value;
   calculating a center for each of the new clusters, each center being calculated based on the feature vectors of at least one base object in a respective new cluster; and
   building an object index based on the centers of the new clusters such that the object index covers the combinatorial object as a target of retrieval.

2. The method of claim 1, wherein the method further comprises: calculating the number of the new clusters to be selected based on a parameter defining an upper limit of space complexity.

3. The method of claim 1, wherein each cluster in the set holds a representative cardinality and one or more participating base objects of each of the clusters, and the enumerating comprises: picking up the multiple clusters having a total size identical to the target size of the additional cluster and with none of the participating base objects in common from among the set, the size of the cluster being defined by the representative cardinality of the cluster.

4. The method of claim 1, wherein each cluster in the set has the center of each of the clusters and holds one or more representative members of each of the clusters, and the enumerating comprises:

calculating a product of a set of one or more representative members in one of the multiple clusters and a set of one or more representative members in other of the multiple clusters; and extracting a limited number of elements closest to the center of the additional cluster from the product as one or more representative members of the additional cluster.

5. The method of claim 1, wherein each new cluster in the new set has one or more members each having the center and a representative cardinality, and the selecting comprises:

obtaining a minimum of the representative cardinality from among the one or more members in the new cluster as a representative cardinality for the new cluster;

calculating the center of the new cluster based on the center of a smallest member of the new cluster having the minimum of the representative cardinality in the new cluster; and extracting a limited number of representative members closest to the center of the new cluster from among a union of a plurality of representative members of the smallest member in the new cluster as one or more representative members of the new cluster.

6. The method of claim 1, wherein the method further comprises: determining whether or not the additional clusters newly enumerated in the enumerating meets a termination condition, the building being performed in response to determining that the additional clusters meet the termination condition.

7. The method of claim 1, wherein the initializing comprises:

preparing elements each corresponding to each of the base objects in the collection;

initializing a representative cardinality, the center, one or more representative members and one or more participating base objects for each element; and clustering the elements into the set of the clusters, the number of the clusters to be clustered being limited by a parameter defining an upper limit of space complexity.

8. The method of claim 7, wherein the initializing further comprises: calculating a representative cardinality, the center, one or more representative members and one or more participating base objects for each cluster based on the representative cardinality, the center, the one or more representative members and the one or more participating base objects of at least one elements in each cluster.

9. The method of claim 1, wherein the method further comprises:

in response to receiving a given query, identifying at least one cluster similar to the given query based on the object index; and returning at least one of the base object and the combinatorial object related to the at least one identified cluster.

10. The method of claim 1, wherein the object index is a human resource index, the base object is a single human resource and the combinatorial object is a combination of two or more of the single human resources.

11. A computer system for building an object index used for retrieving an object matching a given query, by executing program instructions, the computer system comprising:

a memory tangibly storing the program instructions;

a processor in communications with the memory, wherein the computer system is configured to:

initialize a set of clusters, each cluster representing at least one base object of a collection, each base object including a feature vector;

enumerate one or more additional clusters by combining multiple clusters from among the set, each additional cluster representing at least one combinatorial object having two or more base objects of the collection;

select a new set of new clusters by clustering the set of the clusters and the one or more additional clusters, each new cluster representing at least one base or combinatorial object;

alternatively iterate enumeration and selection while treating the new set of the new clusters obtained in previous iteration as the set of the clusters used in current iteration and incrementing a target size of the additional cluster from two up to a predetermined value;

calculate a center for each of the new clusters, each center being calculated based on the feature vectors of the at least one base object in a respective new cluster; and build an object index based on the centers of the new clusters such that the object index covers the combinatorial object as a target of retrieval.

12. The computer system of claim 11, wherein the computer system is further configured to: calculate the number of the new clusters to be selected based on a parameter defining an upper limit of space complexity.

13. The computer system of claim 11, wherein each cluster in the set holds a representative cardinality and one or more participating base objects of each cluster, and the computer system is further configured to: picking up the multiple clusters having a total size identical to the target size of the additional cluster and no participating base objects in common for enumeration, the size of the cluster being defined by the representative cardinality of the cluster.

14. The computer system of claim 11, wherein each cluster in the set has the center of each cluster and holds one or more representative members of each cluster, the computer system is further configured to:

calculate a product of a set of one or more representative members in one of the multiple clusters and a set of one or more representative members in another of the multiple clusters for enumeration; and extract a limited number of elements closest to the center of the additional cluster from the product as one or more representative members of the additional cluster.

15. The computer system of claim 11, wherein each new cluster in the new set has one or more members each having a center and a representative cardinality, and the computer system is further configured to:

obtain a minimum of the representative cardinality from among the one or more members in the new cluster as a representative cardinality for the new cluster;

calculate the center of the new cluster based on the center of a smallest member having the minimum of the representative cardinality in the new cluster; and extract a limited number of representative members closest to the center of the new cluster from a union of a plurality of representative members of the smallest member in the new cluster as one or more representative members of the new cluster.

16. A computer program product for building an object index used for retrieving an object matching a given query, the computer program product comprising a non-transitory computer readable storage medium having program instructions embodied therewith, the program instructions executable by a computer to cause the computer to perform a method comprising:

initializing a set of clusters, each cluster representing at least one base object of a collection, each base object including a feature vector;

enumerating one or more additional clusters by combining multiple clusters from among the set, each additional cluster representing at least one combinatorial object having two or more base objects of the collection;

selecting a new set of new clusters by clustering the set of the clusters and the one or more additional clusters, each new cluster representing at least one base or combinatorial object;

alternatively iterating the enumerating and the selecting while treating the new set of the new clusters obtained in previous iteration as the set of the clusters used in current iteration and incrementing a target size of the additional cluster from two up to predetermined value;

calculating a center for each of the new clusters, each center being calculated based on the feature vectors of the at least one base object in a respective new cluster; and building an object index based on the centers of the new clusters such that the object index covers the combinatorial object as a target of retrieval.

17. The computer program product of claim 16, wherein the method further comprises: calculating the number of the new clusters to be selected based on a parameter defining an upper limit of space complexity.

* * * * *